United States Patent
Pan et al.

(10) Patent No.: US 8,819,607 B1
(45) Date of Patent: Aug. 26, 2014

(54) METHOD AND APPARATUS TO MINIMIZE CLOCK TREE SKEW IN ICS

(71) Applicant: Altera Corporation, San Jose, CA (US)

(72) Inventors: Philip Pan, Fremont, CA (US); Yen-Fu Lin, San Jose, CA (US); Ling Yu, Cupertino, CA (US); Prosenjit Mal, Fremont, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 13/906,814

(22) Filed: May 31, 2013

(51) Int. Cl.
*G06F 17/50* (2006.01)

(52) U.S. Cl.
CPC .................. *G06F 17/5054* (2013.01)
USPC ........................................ 716/113

(58) Field of Classification Search
USPC ........................................ 716/113
See application file for complete search history.

(56) References Cited

U.S. PATENT DOCUMENTS

| | | | | |
|---|---|---|---|---|
| 5,298,866 A | * | 3/1994 | Kaplinsky | 327/261 |
| 5,892,373 A | * | 4/1999 | Tupuri et al. | 326/97 |
| 2001/0047450 A1 | * | 11/2001 | Gillingham et al. | 711/105 |

* cited by examiner

*Primary Examiner* — Suchin Parihar
(74) *Attorney, Agent, or Firm* — R&D Patent Attorneys

(57) ABSTRACT

A method and circuit with minimized clock skews in an IC. One embodiment includes placing an application specific IP block at a predetermined location in an integrated circuit (IC), the IC having a clock network that distributes a clock signal, the clock network having one or more clock buses, each clock bus providing the clock signal to a row of logic blocks of the IC, each clock bus having one or more clock nets; determining the electrical load on a first clock driver driving a first clock net of a first clock bus providing the clock signal to a first row of logic blocks; identifying at least one other target clock driver to be coupled to the first clock net, the at least one other target clock driver driving a clock net of a clock bus providing the clock signal to a row of logic blocks other than the first row of logic blocks; selecting the at least one other target clock driver to couple to the first clock net; coupling the at least one other target clock driver to the first clock net; and verifying by one or more types of simulation the desired functional and timing performance of the affected logic blocks after connection of the compatible clock nets.

20 Claims, 8 Drawing Sheets

METHOD AND APPARATUS TO MINIMIZE CLOCK TREE SKEW IN ICS

BACKGROUND OF THE INVENTION

Integrated Circuits (ICs) typically have clock networks (nets) to distribute one or more clock signals as standard time references to each section of an IC. Different sections of the IC can have significantly different clock loadings and different needs for amplification of the clock signals. These differences between the sections can cause propagation time differences in clock signals, sometimes called clock tree skew, between the sections of the IC.

If the clock tree skew becomes too large between the sections of an IC compared to the clock period, this can become a serious problem in IC design for virtually any type of IC.

SUMMARY

The present invention minimizes clock skew across a programmable IC. Embodiments of the invention can be implemented in numerous ways. Three aspects of the invention are described below.

A first aspect of the invention is directed to a method to minimize clock skew. The method includes placing an application specific IP block at a predetermined location in an integrated circuit (IC), the IC having a clock network that distributes a clock signal, the clock network having one or more clock buses, each clock bus providing the clock signal to a row of logic blocks of the IC, each clock bus having one or more clock nets; determining the electrical load on a first clock driver driving a first clock net of a first clock bus providing the clock signal to a first row of logic blocks; identifying at least one other target clock driver to be coupled to the first clock net, the at least one other target clock driver driving a clock net of a clock bus providing the clock signal to a row of logic blocks other than the first row of logic blocks; selecting the at least one other target clock driver to couple to the first clock net; coupling the at least one other target clock driver to the first clock net; and verifying by one or more types of simulation the desired functional and timing performance of the affected logic blocks after connection of the compatible clock nets.

A second aspect of the invention is directed to a method to minimize clock skew. The method includes determining the electrical load on a plurality of clock nets, creating an RC loading table for a plurality of clock nets for a functional element in the chip, analyzing the overall clock loading with the functional element based on the clock usage within the functional element, deciding how many clock connections to make for the function element, performing a timing analysis after the clock connections are made, testing to decide if a large correction is needed, if the test determines a large correction is needed, then regrouping functional elements as needed to implement a large correction, and then creating a new RC loading table, testing to determine if a small correction is needed and deciding again how many clock connection to make to satisfy the timing analysis, and then finishing the clock connections if the timing analysis is satisfied.

A third aspect of the invention is directed to a programmable IC with one or more compatible clock nets connected together to minimize clock skew.

BRIEF DESCRIPTION OF THE DRAWINGS

Non-limiting and non-exhaustive embodiments of the invention are described with reference to the following figures.

DETAILED DESCRIPTION

Some terms used in this detailed description are defined as follows. A PLD is a programmable logic device. A logic block is a group of pre-formed logic elements that can be programmed or otherwise in some way electrically coupled together and dedicated to perform a logical function. A CRAM is a configurable random access memory that can be used a programmable coupling. An IP block is an Intellectual Property block. An ASIC is an Application Specific Integrated Circuit. A LAB is a logic array block, such as a matrix of logic elements LE.

A LE is a programmable logic circuit block that provides for efficient implementation of user defined logic functions. For example, a FPGA has numerous logic elements LE that can be configured to implement various combinatorial and sequential functions. The logic elements LE have access to a programmable interconnect structure. The programmable interconnect structure can be programmed to interconnect the logic elements LE in almost any desired configuration.

Figure 1:
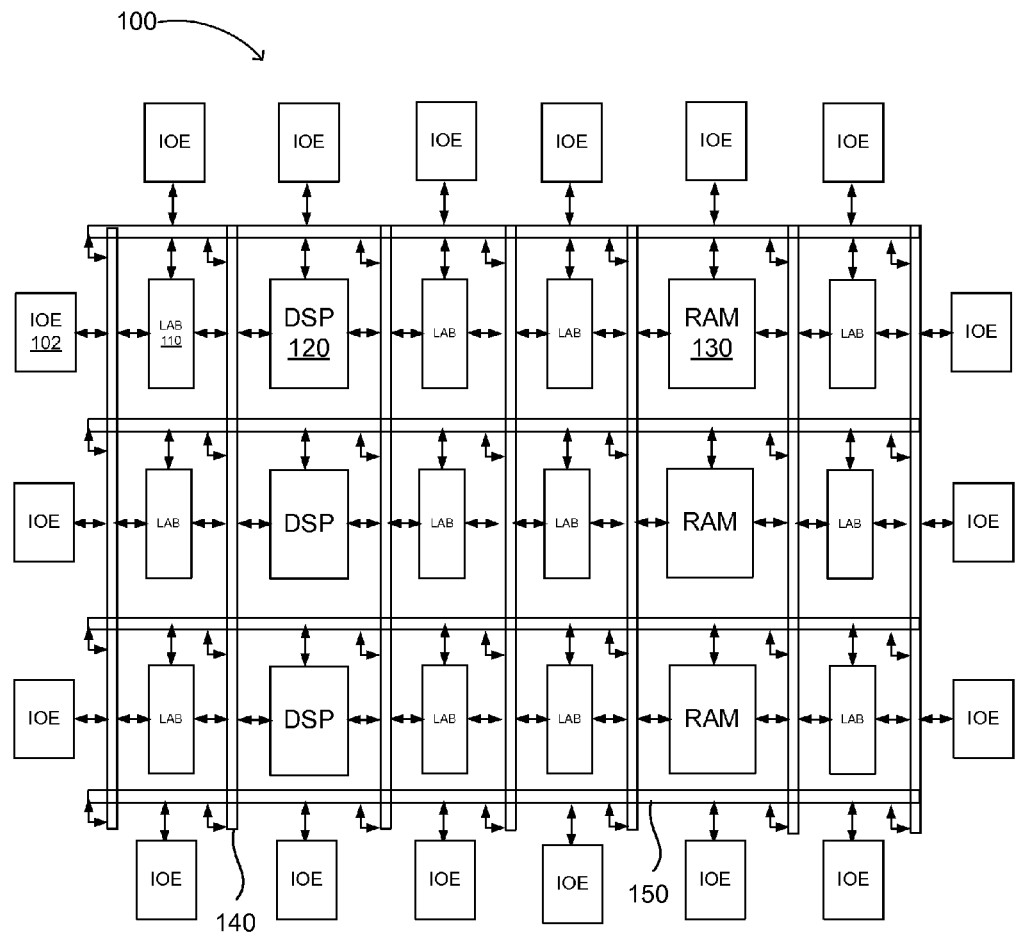
FIG. 1 illustrates an embodiment of an integrated circuit such as programmable logic device (PLD) having an exemplary routing topology, in accordance with the prior art.

The embodiments described herein provide various methods and circuits that substantially minimize clock skews in a clock distribution network. It should be understood that such embodiments can be used in numerous types of integrated circuits, such as programmable logic devices (PLDs), complex programmable logic devices (CPLDs), programmable logic arrays (PLAs), field programmable gate arrays (FPGAs), and application specific integrated circuits (ASICs). Therefore, for simplicity, PLD will be used as a generic term. For example, it is to be understood that the PLD illustrated in FIG. 1 is described for illustrative purposes only and that similar embodiments of the invention can be implemented on many different types of programmable ICs.

In the case of programmable ICs, such as Application Specific Integrated Circuits (ASICs), it can be a challenge to deal with un-even clock loadings on traditional logical array block (LAB) rows when new ASIC-like IPs, (e.g., a microprocessor, a high-speed interface, a hard-coded memory controller, or equivalents) are added into the sub-system cores. This not only replaces some of existing programmable logic device (PLD) IPs, but this also can take away pre-assigned signal routing areas from one or more clock networks.

In accordance with one embodiment, clock skews in a clock distribution network are substantially minimized by using programmable gates which work as miniature bridges to couple one or more clock nets with different loadings. The clock driver on the less loaded clock net can be used to supplement the drive capability of the clock driver on the more loaded net to have a balanced clock delay time through electron charge sharing. Thus, the clock skew can be minimized among designated clock nets for ASIC-like PLDs.

In one embodiment of the invention, a programmable solution is advantageously used to reduce clock skew by selectively coupling two or more clock nets that have different loads. In another embodiment of the invention, a programmable solution is advantageously used to leverage clock drivers on their associated clock nets by using electron charge sharing to compensate for the delay difference among small clock networks. In one embodiment of the invention, a programmable solution is advantageously achieved by the use of programmable coupling elements, such as a single programmable Configuration RAM (CRAM) or multiple CRAM cells to control various clock areas from two Logic Array Block (LAB) rows up to the whole sub-system.

In another embodiment of the invention, substantially balancing the clock skews of the clock networks using programmable coupling elements can simplify floor planning efforts on global clock network placement, since the programmable coupling elements can be used to reconfigure the clock network such that clock skew is substantially minimized between the clock nets in the reconfigured clock network. Such techniques can be advantageously used when hard IP blocks are placed in a PLD, resulting in a clock network that can have uneven clock loadings on different clock branches that can vary based on the placement of the hard IP blocks (resulting in clock skews between these such branches), since the clock skews can be substantially minimized by reconfiguring the clock distribution network using the programmable coupling elements without requiring a change in the global clock network or the placement of the hard IP blocks. Thus, the embodiments described herein can be advantageously used when IP blocks are added to a PLD or to an ASIC with a preexisting floor plan and clock distribution network.

In a high-speed programmable data communication system, the clock network is required to have not only enough quantity of clocks for driving multiple threads of data paths, but the clock network also needs smaller timing differences among clock nets for accurate data transfer among different clock domains of embedded systems. The timing difference between two clock nets is called "clock skew." A tolerable clock skew is typically measured by the percentage of a clock cycle.

For example, a clock system that runs at a 500 Mhz clock frequency has a 2 nanosecond (ns) clock cycle. If the tolerable clock skew is 10%, the maximum timing difference is 2 ns*10%=200 picoseconds (ps). Then, this 200 ps could be the cut-off time to decide whether there needs to be an iteration of clock load balancing or not. As another example, the cycle time for a 400 Mhz clock system is 2.5 ns. If a user's requirement for the clock skew tolerance is 5%, the cut-off decision could then be 2.5 ns*5%=125 ps.

The preceding are only illustrative examples. In summary, the criteria for a timing difference are: (1) what clock frequency/clock cycle the user is using, (2) what percentage of clock skew the user is choosing to accept, and (3) what extra percentage (if any) is reserved as an extra design safety margin (e.g., 0.5%, ranging more or less in various embodiments) in addition to the user's acceptable clock skew. In one embodiment, 300 ps could be an acceptable clock skew in balancing a clock network, depending on how a user chooses to utilize their clock nets. In one embodiment, software could either utilize such a default number or alternatively utilize some criteria set by the user to determine whether a clock network is balanced or whether it needs to be rebalanced.

In order to minimize clock skew, a programmable logic device (PLD) clock network needs to be balanced for optimal clock signal routing throughout a PLD. And a PLD clock network therefore needs to be rebalanced after a hard IP block is added to a PLD. Generally, in order to achieve a good quality clock network, a PLD chip requires some time-consuming iterative efforts on chip floor planning. The chip is typically divided into multiple symmetrical blocks with similar physical sizes (e.g., two halves, four quadrants, other equal-size array blocks, and so forth). Also, the chip typically has an H-shape of clock trees for every sub-system to guarantee similar clock loadings on all clock branches and to ensure minimum clock skew after full-chip assembly.

When the electrical demands of a system on a programmable chip (SOPC) grows, new application specific IP blocks that perform predefined functions may be included on the same integrated circuit die in addition to a plain PLD core with traditional PLD IPs (e.g., a logic array block (LAB), dual-port static ram access memory (SRAM), digital signal processor (DSP), and equivalents). Such an addition of new application-specific IP blocks (e.g. microprocessor, high-speed interface, and hard-coded memory controller, and equivalents), into the PLD core, can replace PLD IPs in a sub-section of the IC. In addition, the addition of application specific IP blocks can also result in shortening or removing the clock branches in the sub-section of the IC where the application specific IP block is placed, as well as modification of the clock network to route the clock around the application specific IP block. Such modifications to the clock network resulting from the placement of the application specific IP block can cause un-even clock loadings on different clock branches of the modified clock network, which introduces extra clock skews depending on the physical location (or placement) of the application-specific IPs in the PLD core or the IC. Thus, there needs to be an easy implemented circuitry for minimizing the PLD clock tree skew resulting from the placement of application-specific IPs in the PLD core.

One embodiments of this invention creates an easy de-skew capability by using programmable gates which work as miniature bridges to connect clock nets with different loadings. Then, the clock driver on the less loaded clock net can help the clock driver on the more loaded net to have a balanced clock delay time (e.g., through electron charge sharing). Thus, the clock skew can be minimized among designated clock nets for future ASIC-like PLDs.

One embodiment of the invention provides the benefit of providing a programmable solution that reduces clock skew by connecting clock nets that have different loads together and forming two-dimensional sub-clock network systems with multiple clock drivers. One embodiment of the invention provides the benefit of leveraging all clock drivers on their associated clock nets by using electron charge sharing to compensate for the delay difference among small clock networks. One embodiment of the invention provides the benefit of being able to use single Configuration RAM (CRAM) or multiple CRAM cells, depending on the physical need, to connect clock nets from two or more LAB rows up to the whole sub-system core. One embodiment of the invention provides the benefit of simplifying the floor planning efforts on global clock network placement and allows the focus of more efforts on critical IP placement for future complex PLD devices.

Software or hardware timing simulation by commercially available simulation packages (discussed below) of potentially compatible clock nets can help in determining if a clock driver in a row can be shared (i.e., electrically coupled for functional support) to help another clock driver drive a load. Connecting compatible clock nets that can be shared can be accomplished by using configurable coupling elements (e.g., the configurable coupling elements of the embodiments described below) to connect compatible clock nets (i.e., compatible in the sense that their clock phases can be the same). As long as the input of all additional clock drivers is the same as the input of the first clock drive, they can be coupled. Otherwise, if adjacent clock drivers use different clock sources, they cannot be coupled. Ideally, there is no limit to the number of clock nets can be coupled if inputs of all coupled clock drivers are identical and from an ideal source. However, in real-life design, there is always a physical limitation on the maximum number of clock drivers which can be coupled.

Software or hardware simulation by commercially available simulation packages (discussed below) can be help in identifying at least one other target clock driver to be coupled to a clock net, and in verifying the desired performance (e.g., checking the functionality and/or timing of the functionality) of each LE in the IC after connection of the compatible clock nets. For example, in one embodiment, a timing simulation using SPICE or an equivalent software package would provide a dynamic way to determine the timing delay time of a clock net, but this would not be the only way to measure clock delay. Another way to determine timing delay time of a clock net is using a static method.

One static method is counting the number of LEs that each clock net runs through, then multiplying the segment delay of each LE to calculate a total delay of a clock net. For example, if an LE has a 10 ps delay, a 30-LE long clock net will have 10 ps*30=300 ps delay time. Another static method is performing a Resistance-Capacitance (RC) extraction across all the target clock nets to obtain RC loading information (in pico-farads) for all the target clock nets. The next step is translating by calculation the pico-farads to a delay timing. For example, if 1 pico-farad (pf) loading gives a 10 ns clock delay, a 0.075 pf net will have a 0.075*10 ns=750 ps delay time.

FIG. 1 illustrates an embodiment of an integrated circuit such as programmable logic device (PLD) 100 having an exemplary routing topology, in accordance with the prior art. As shown, the programmable logic device (PLD) may include a two-dimensional array of functional blocks, including logic array blocks (LABs) 110 and other functional blocks, such as random access memory (RAM) blocks 130 and digital signal processing (DSP) blocks 120, for example. The PLD may also include programmable interconnect in the form of vertical routing channels 140 and horizontal routing channels 150, each routing channel including one or more routing wires. In addition, input/output elements (IOEs) 102 may be located around the periphery of the chip.

Typically, each wire is driven at a single logical point by a driver. The driver may be associated with a multiplexer which selects a signal to drive on the wire. In the case of channels with a fixed number of wires along their length, a driver may be placed at each starting point of a wire. Note that other routing wire topologies, besides the topology depicted in FIG. 1, are possible. For example, the routing topology may include wires that travel diagonally or that travel horizontally and vertically along different parts of their extent as well as wires that are perpendicular to the device plane in the case of three dimensional integrated circuits. The routing topology may include global wires that span substantially all of PLD 100, fractional global wires such as wires that span part of PLD 100, staggered wires of a particular length, smaller local wires, or any other suitable interconnection.

Figure 2:
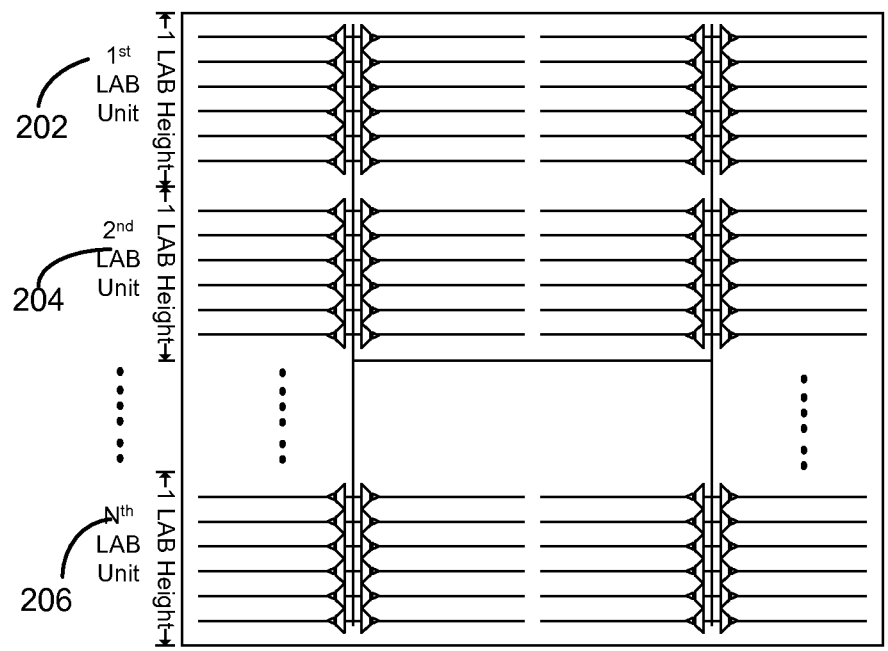
FIG. 2 illustrates some clock trunks and branches of a typical H-shape clock network in a sub-system PLD core, in accordance with the prior art.

FIG. 2 illustrates some clock trunks and branches of a typical H-shape clock network in a sub-system PLD core (i.e., a group of logical elements in the core that perform a distinct function), in accordance with the prior art. For this example, it is assumed that each logic array block (LAB) row 202, 204, and 206 has 6 LABCLK nets, LABCLK[5:0]. In this example, every LABCLK net has a dedicated clock driver, shown on this Figure both with a clock driver to the left of the clock trunk and a clock driver to the right of the clock trunk.

Figure 3:
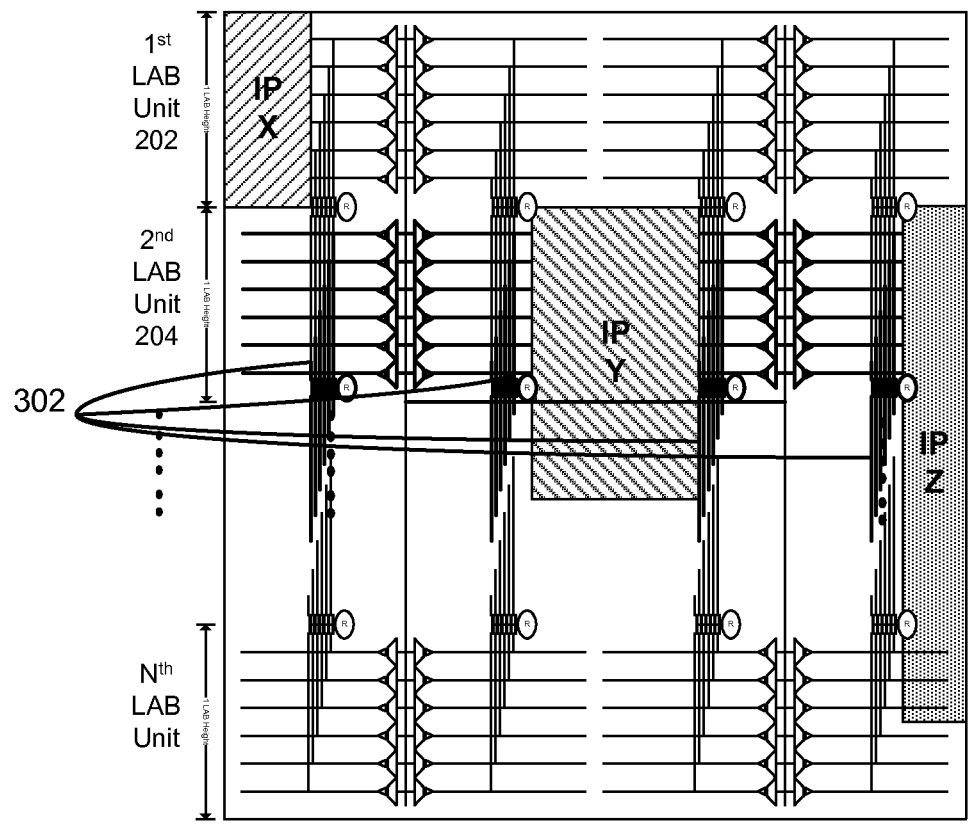
FIG. 3 illustrates some clock branches of a typical H-shape clock network in a sub-system PLD core, as well as some traditional PLD IP area that are occupied by application-specific IPs, in accordance with one embodiment of the invention.

FIG. 3 illustrates some clock branches of a typical H-shape clock network in a sub-system PLD core, as well as some traditional PLD IP area that are occupied by application-specific IPs, in accordance with one embodiment. In this example, programmable gates 302 can selectively connect one or more of the six clock nets shown for the 1st LAB unit 202 and the 2nd LAB unit 204. The application-specific IPs (sometimes called hard IPs) X, Y, and Z can have random sizes in both X and Y dimensions. In other words, the application-specific IPs (i.e., hard IPs) can take a small amount of resources or a large amount of resources from the PLD core, depending on their functional requirements.

Figure 4:
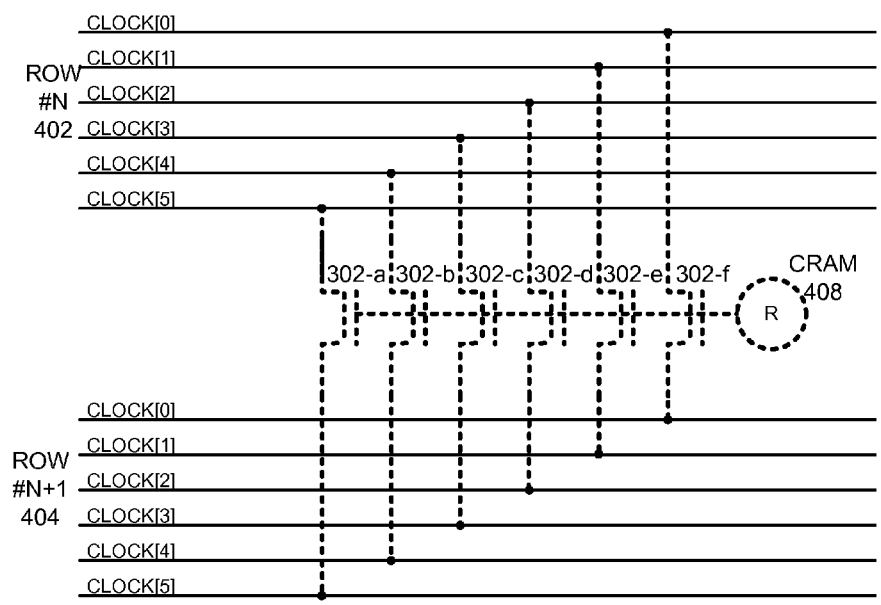
FIG. 4 illustrates programmable gates to connect clock nets, in accordance with one embodiment of the invention.

FIG. 4 illustrates programmable coupling elements 302 (individually labeled as 302-a, 302-b, 302-c, 302-d, 302-e, and 302-f), drawn in dark bold lines, which can be used to selectively couple clock networks associated with two LABs, in accordance with one embodiment. In one embodiment, the programmable coupling elements can be pass transistors. The programmable coupling elements can be controlled to selectively couple two clock networks by programming values of one or more Configuration RAM (CRAM) bits (i.e., setting them to "1" or "0"). In the embodiment shown in FIG. 4, all the programmable coupling elements coupling the clock nets of ROW 402 to the clock nets of ROW 404 are controlled by one CRAM bit such that each of the clock nets (e.g., CLOCK[0], CLOCK[1], CLOCK[2], CLOCK[3], CLOCK[4], CLOCK[5]), of ROW #N 402 is coupled with the corresponding clock net of ROW #N+1 404. In one embodiment, programmable coupling elements 302 are placed between adjacent LAB units that can be used to selectively couple the clock nets of adjacent LAB units. Various embodiments of the programmable coupling elements can be implemented using suitable arrangements of conductors, transistors, programmable gates, Configuration RAMs (CRAMs), and equivalents, in accordance with the embodiments described herein.

In one embodiment, the programmable coupling elements 302 can be implemented using pass transistors having a minimum size (e.g., a length and width as drawn) for the fabrication process used to manufacture the IC, such that these elements can be placed under the major power grids of a PLD. Such placement of the programmable coupling element can be advantageously used to add the programmable coupling elements in a PLD core with substantially low impact on the size of the PLD core. In the embodiment shown in FIG. 4, the programmable coupling elements 302 are CMOS pass gates. Other embodiments can be implemented with other types of programmable interconnect structures or connections utilizing other semiconductor or conductor technologies.

Figure 5:
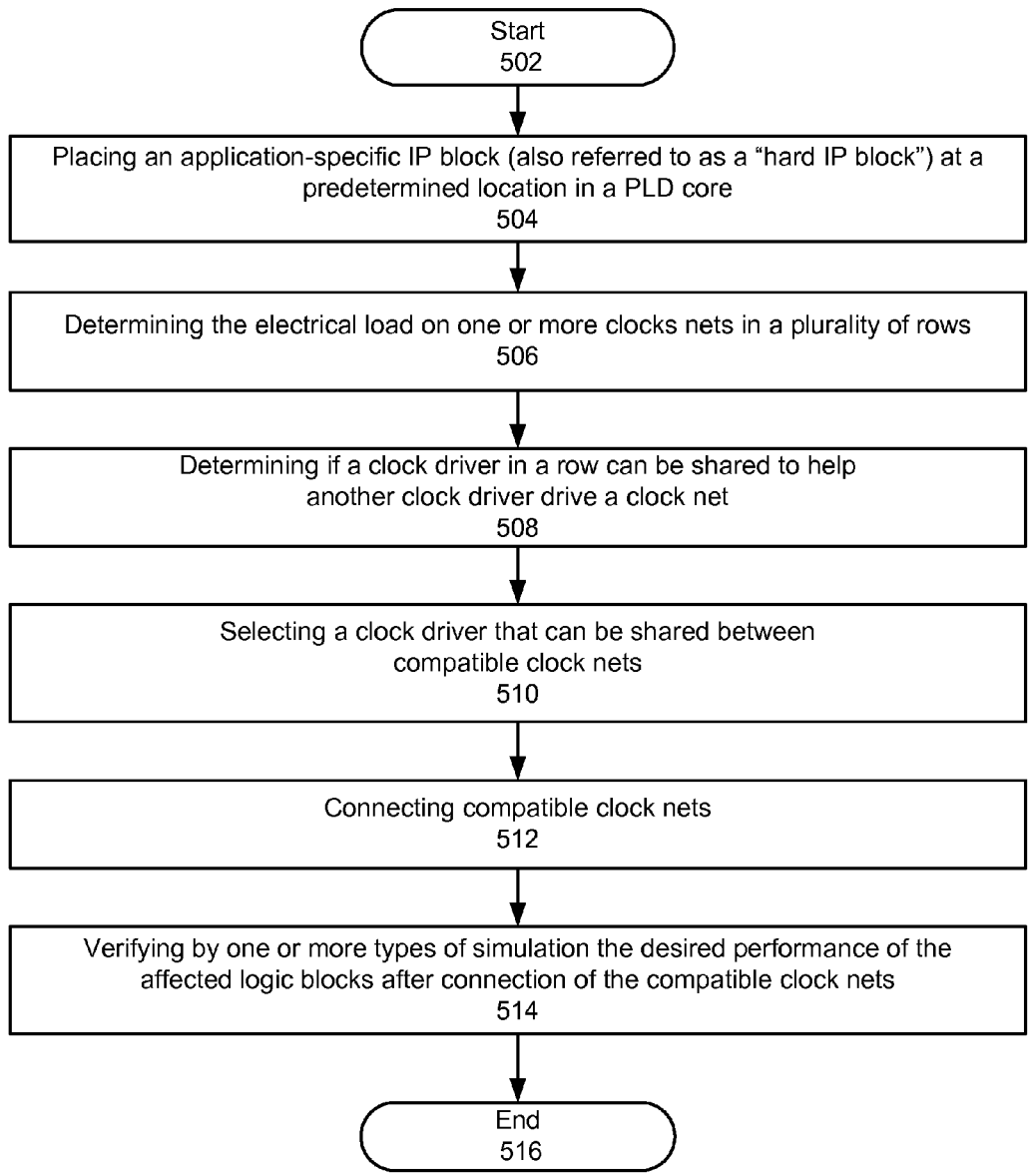
FIG. 5 illustrates a flowchart of a method to minimize clock skew, in accordance with one embodiment of the invention.

FIG. 5 illustrates a flowchart of a method to minimize clock skew, in accordance with one embodiment of the invention. The following operations can be performed with commercially available tools, or they can be performed by proprietary tools. The sequence of operations can also be varied in different embodiments of the invention. The sequence starts in operation 502. Operation 504 includes placing an application-specific IP block (also referred to as a "hard IP block") at a predetermined location in a PLD core. Operation 506 includes determining the electrical load on one or more clock nets in a functional element (e.g., a sub-system having specific inputs and outputs) in an IC. In one embodiment, determining the electrical load includes measuring the length of one or more clock nets in a plurality of rows of logic array blocks after one or more hard IPs are fixed in place. Operation 508 includes determining if a clock driver in a row can be shared (i.e., electrically coupled for functional support) to help another clock driver drive a load. Operation 510 includes selecting compatible clock nets that can be shared. Operation 512 includes connecting compatible clock nets that can be shared. In one embodiment, connecting compatible clock nets includes using configurable coupling elements (e.g., the configurable coupling elements of the embodiments described above) to connect compatible clock nets (i.e., compatible in the sense that their clock phases can be the same) that can be shared. Operation 514 includes verifying (i.e., checking the functionality and timing of the functionality by hardware or software simulation models) the desired performance of affected logic blocks after connection of the compatible clock nets. The method ends in operation 516.

Figure 6:
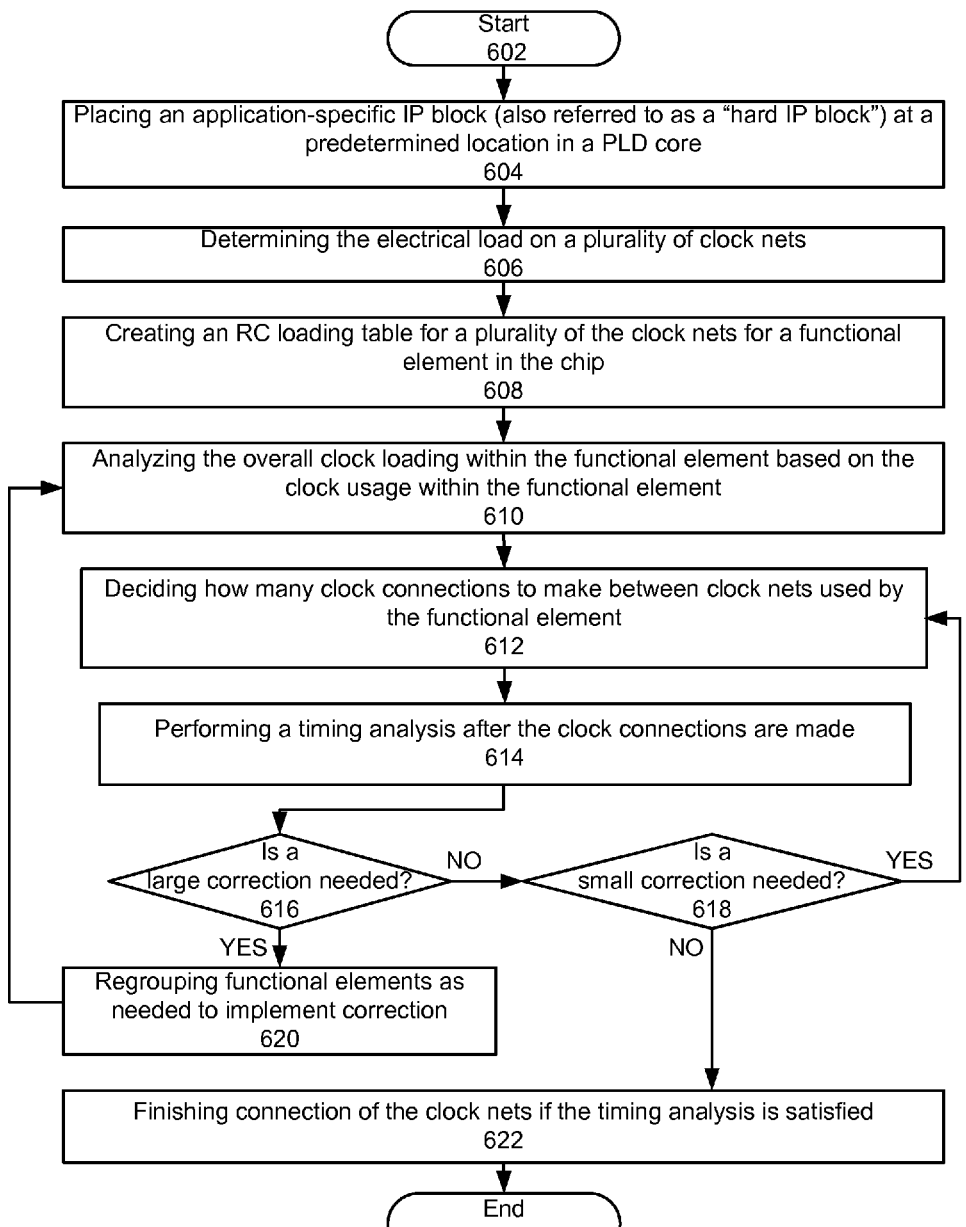
FIG. 6 illustrates a flowchart of a method to minimize clock skew, in accordance with one embodiment of the invention.

FIG. 6 illustrates a flowchart of a method to minimize clock skew, in accordance with one embodiment of the invention. The following operations can be performed with commercially available tools, or they can be performed by proprietary tools. The sequence of operations can also be varied in different embodiments of the invention. The sequence starts in operation 602. Operation 604 includes placing an application-specific IP block (also referred to as a "hard IP block") at a predetermined location in a PLD core. Operation 606 includes determining the electrical load on a plurality of clock nets. In one embodiment, the load can be determined by use of a commercially available RC extraction tool that calculates or estimates the resistance R and capacitance C of one or more nets. In other embodiments, other techniques can be used to determine the electrical load on a plurality of nets. Operation 608 includes creating an RC loading table for a plurality of clock nets for a functional element in the chip. Operation 610 includes analyzing the overall clock loading with the functional element based on the clock usage within the functional element. Operation 612 includes deciding how many clock connections to make for the function element. Operation 614 includes performing a timing analysis after the clock connections are made. Operation 616 includes a test to decide if a large correction is needed. If the test of operation 616 results in a "YES", then operation 620 is next and includes regrouping functional elements as needed to implement a large correction, then operation 610 is next. If the test of operation 616 results in a "NO", then operation 618 is next and includes a test to determine if a small correction is needed. If the test of operation 618 results in a "YES", then operation 612 is next. If the test of operation 618 results in a "NO", then operation 622 is next and includes finishing the clock connections if the timing analysis is satisfied. The method ends in operation 624.

In various embodiments of the invention, commercially available computer aided design (CAD) tools can be used for RC extraction and timing analysis, such as PrimeTime available from Synopsis (with corporate headquarters in Mountain View, Calif.), or the Encounter® Timing System available from Cadence Design Systems (with corporate headquarters in San Jose, Calif.). In various embodiments, one or more operations can be performed with commercially available tools, or they can be performed by equivalent proprietary tools. The sequence of operations can also be varied in different embodiments of the invention.

Figure 7:
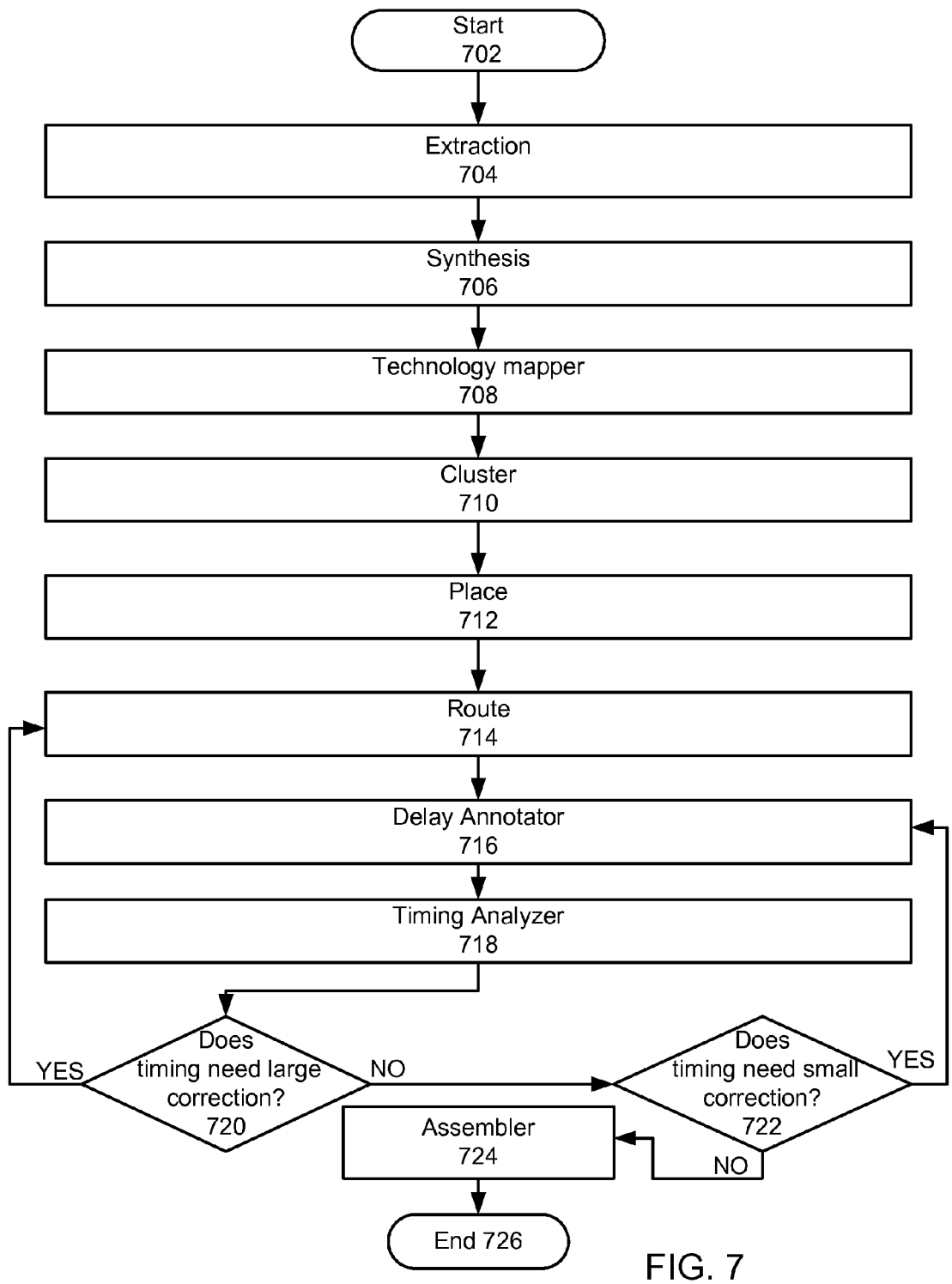
FIG. 7 illustrates a flowchart of a method to minimize clock skew, in accordance with one embodiment of the invention.

FIG. 7 illustrates a flowchart of a method to minimize clock skew, in accordance with one embodiment of the invention. The following operations can be performed with commercially available tools, or they can be performed by proprietary tools. The sequence of operations can also be varied in different embodiments of the invention. The sequence starts in operation 702. Operation 704 includes extracting information for a functional element with an extraction module. Operation 706 includes synthesizing a functional element with a synthesis module. Operation 708 includes using a technology mapper to map a functional element. Operation 710 includes using a cluster module to cluster functional elements. Operation 712 includes using a placing module to place a functional element. Operation 714 includes using a router to route signals and clocks for a functional element. Operation 718 includes using a timing analyzer to analyze the timing of a plurality of clocks utilized by a functional element. Operation 720 includes a test to decide if a large correction is needed for the timing. If the test of operation 720 results in a "YES", then operation 714 is next. If the test of operation 720 results in a "NO", then operation 722 is next and includes a test to determine if a small correction is needed. If the test of operation 722 results in a "YES", then operation 716 is next. If the test of operation 722 results in a "NO", then operation 724 is next. Operation 724 includes assembly of the functional element or chip. The method ends in operation 726.

FIG. 7 can be implemented in different ways in different embodiments of the invention. For example, in one embodiment of the invention, FIG. 7 can be implemented on a specially programmed processing unit. The method can include a compilation process that includes an extract phase 704, a synthesis phase 706, a technology mapping phase 708, a cluster phase 710, a place phase 712, a route phase 714, a delay annotator phase 716, a timing analysis phase 718, and an assembler phase 724. In one embodiment, a processing unit executes the compilation process to convert a user design expressed, for example, as a Hardware Description Language (HDL) by a user, into a programmable device configuration to configure a PLD to implement the user design. The processing unit executes extract phase 704 to convert the user design into a register transfer layer description. The processing unit executes synthesis phase 706 to convert the register transfer layer description of the user design into a set of logic gates. The processing unit then executes technology mapping phase 708 to map the set of logic gates into a set of atoms, which are irreducible constituents of the user design. The atoms may correspond to groups of logic gates and other components of the user design matching the capabilities of LEs or other functional blocks of the PLD. The user design may be converted into any number of different sets of atoms, depending upon the underlying hardware of the PLD used to implement the user design.

In one embodiment, the processing unit further executes cluster phase 710 to group related atoms together into clusters. The processing unit also executes place phase 712 to assign clusters of atoms to locations on the PLD. The processing unit executes route phase 714 to determine a configuration of a configurable switching circuit of the PLD used to connect the atoms implementing the user design. The processing unit executes delay annotator phase 716 to determine a plurality of signal delays, such as data delays, for the set of atoms and their associated connections in the configurable switching circuit by using a timing model of PLD. The processing unit executes timing analysis phase 718 to determine whether the implementation of the user design in the PLD will meet a plurality of long-path and short-path timing constraints specified by a user's constraint rules file.

In one embodiment of the invention, the processing unit executes assembler phase 724 to generate configuration information specifying the configuration of the PLD implementing the user design, including the configuration of each LE used to implement the user design and the configuration of the configurable switching circuit used to connect the LEs. The processing unit executes assembler phase to write the configuration information to a configuration file, which can be stored within a memory device and can then be used to configure the PLD to implement the user design.

Figure 8:
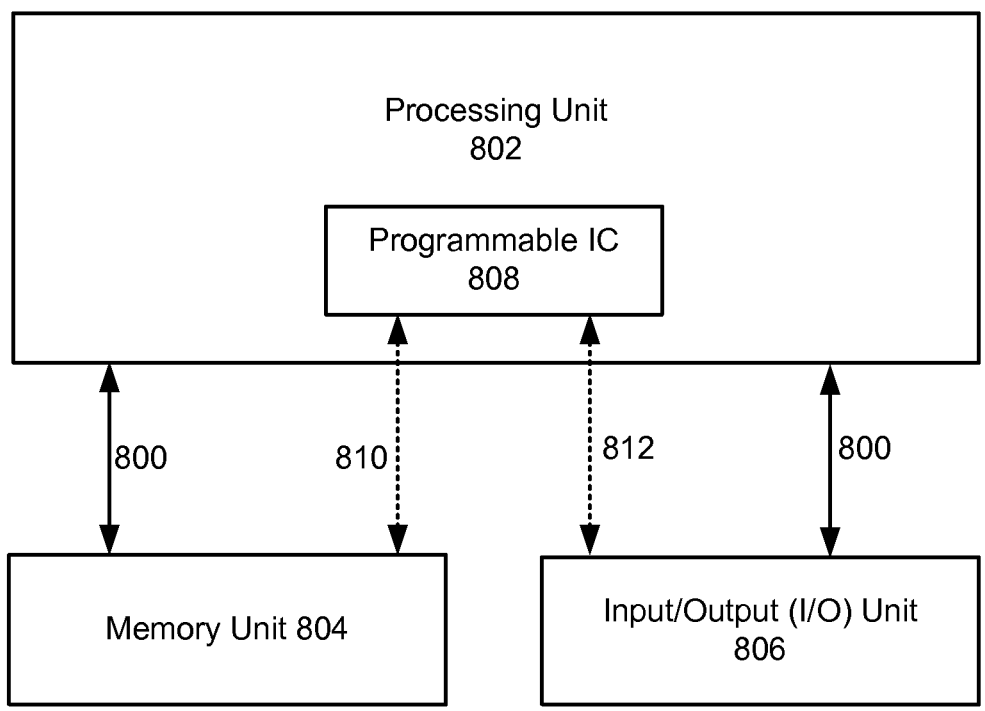
FIG. 8 illustrates a system that includes a programmable integrated circuit with minimized clock skew, in accordance with one embodiment of the invention.

The present invention can also be implemented in a system that has a PLD (e.g., an FPGA or other programmable IC) as one of several components. FIG. 8 (discussed in detail below) shows a block diagram of an exemplary digital system that can embody techniques of the present invention. This system can be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Furthermore, this system can be provided on a single board, on multiple boards, or within multiple enclosures.

The system shown in FIG. 8 includes a processing unit 802, a memory unit 804, and an input/output (I/O) unit 806 interconnected together by one or more buses 800. According to this exemplary embodiment, a programmable integrated circuit (IC) 808 is embedded in processing unit 802. Programmable IC 808 can serve many different purposes within the system of FIG. 8. In one embodiment, programmable IC 808 can be a logical building block of processing unit 802, supporting its internal and external operations. Programmable 808 is programmed to implement the logical functions necessary to carry on its particular role in the operation of the system. In one embodiment, programmable IC 808 can be specially coupled to memory unit 804 through bus 810 and to I/O unit 806 through bus 812.

Processing unit 802 can direct data to an appropriate system component for processing or storage, execute a program stored in memory unit 804, receive and transmit data via I/O unit 806, or other similar functions. Processing unit 802 can be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more programmable ICs 808 can control the logical operations of the system. As another example, programmable IC 808 acts as a reconfigurable processor, which can be reprogrammed as needed to handle a particular computing task. Alternatively, programmable IC 808 can itself include an embedded microprocessor. Memory unit 804 can be a random access memory (RAM), read only memory (ROM), fixed or flexible disk media, flash memory, tape, or any other storage means, or any combination of these storage means.

In one embodiment, in accordance with the present invention, there is a processing unit including a programmable integrated circuit with a minimized clock skew, wherein the programmable integrated circuit includes one or more functional elements, wherein the one or more functional elements have a plurality of clock nets, the electrical loads on the plurality of the clock nets of the one or more functional elements were analyzed after one or more hard IPs were fixed in place on the programmable integrated circuit, and one or more clock nets that can be shared were connected after determining one or more compatible clock drivers of the plurality of clock nets that can help at least one clock driver drive their respective clock net for at least one functional element, and the desired performance of the at least one functional element of the programmable integrated circuit was verified after connection of the one or more compatible clock drivers by simulation; a memory unit coupled to the processing unit by one or more buses; and an input/output unit coupled to the memory unit and the processing unity by one or more buses.

In one embodiment, in accordance with the present invention, software (i.e., instructions) for implementing the aforementioned algorithms may be provided on computer-readable media. It will be appreciated that each of the algorithmic steps (described above in accordance with the invention), and any combination of these steps, can be implemented by computer program instructions. These computer program instructions can be loaded onto a computer or other programmable apparatus to produce a machine, such that the instructions which execute on the computer or other programmable apparatus create means for implementing the functions specified in the flowchart block or blocks. These computer program instructions can also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions can also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Several embodiments of the invention are possible. The phrase "in one embodiment" used in the specification can refer to a new embodiment, a different embodiment disclosed elsewhere in the application, or an embodiment disclosed elsewhere in the application. The foregoing description is not intended to be exhaustive or to limit the present invention to the examples disclosed herein. In some instances, features of the present invention can be employed without a corresponding use of other features as set forth. Many modifications, substitutions, and variations are possible in light of the above teachings, without departing from the scope of the present invention. Therefore, those skilled in the art will recognize that other embodiments could be practiced without departing from the scope and spirit of the claims set forth below.

What is claimed is:

1. A method comprising:
placing an application specific IP block at a predetermined location in an integrated circuit (IC), the IC having a clock network that distributes a clock signal, the clock network having one or more clock buses, each clock bus providing the clock signal to a row of logic blocks of the IC, each clock bus having one or more clock nets;
determining the electrical load on a first clock driver driving a first clock net of a first clock bus providing the clock signal to a first row of logic blocks;
identifying at least one other target clock driver to be coupled to the first clock net, the at least one other target clock driver driving a clock net of a clock bus providing the clock signal to a row of logic blocks other than the first row of logic blocks;

selecting the at least one other target clock driver to couple to the first clock net;
coupling the at least one other target clock driver to the first clock net; and
verifying by one or more types of simulation the desired functional and timing performance of the affected logic blocks after connection of the compatible clock nets.

2. The method of claim 1, wherein the at least one other target clock driver can be in the same clock bus as the first clock bus or in a different clock bus from the first clock bus.

3. The method of claim 1, wherein each corresponding clock driver and clock net on two or more clock buses can selectively be coupled together.

4. The method of claim 1, wherein determining the electrical load on one or more clock nets includes measuring the length of the one or more clock nets.

5. The method of claim 1, wherein connecting compatible clock nets includes using one or more configurable coupling elements to connect compatible clock nets.

6. The method of claim 1, wherein verifying the desired performance of the functional element of the IC includes using a timing analysis CAD tool.

7. The method of claim 1, wherein an RC extraction CAD tool is utilized in determining the electrical load on one or more clock nets.

8. A method to minimize clock skew, said method comprising:
determining the electrical load on a plurality of clock nets,
creating a resistance-capacitance (RC) loading table for a plurality of clock nets for a functional element in an IC chip,
analyzing the overall clock loading within the functional element based on the clock usage within the functional element,
deciding how many clock net connections to make between clock nets used by the functional element,
performing a timing analysis after the clock connections are made,
testing to determine if a large correction is needed,
if yes, then regrouping functional elements as needed to implement a large correction, then re-analyzing the overall clock net loading with the functional element,
if no, then testing to see if a small correction is needed,
if yes, then re-deciding how many clock net connections to make between clock nets used by the functional element, and
if no, then finishing the connection of the clock nets if the timing analysis is satisfied.

9. The method of claim 8, wherein determining the electrical load on one or more clock nets includes measuring the length of the one or more clock nets.

10. The method of claim 8, wherein finishing connection of the clock nets if the timing analysis is satisfied includes using hardware control to connect compatible clock nets.

11. The method of claim 10, wherein using hardware control to connect compatible clock nets includes using one or more CMOS gates to make the connection.

12. The method of claim 8, wherein verifying the desired performance of the functional element of the IC includes using a timing analysis CAD tool.

13. The method of claim 8, wherein an RC extraction CAD tool is utilized in determining the electrical load on one or more clock nets.

14. The method of claim 8, wherein the functional element is a hard IP fixed on the programmable IC.

15. The method of claim 8, wherein more than two clock nets are connected.

16. An integrated circuit IC with a minimized clock skew, comprising:
one or more functional elements, wherein one or more functional elements have a plurality of clock nets, the electrical load on the plurality of the clock nets of the one or more functional elements was analyzed after one or more hard IPs were fixed in place on the IC, and a plurality of clock drivers that can be shared were connected after determining which clock drivers of the plurality of clock drivers can help other clock drivers drive their respective clock nets for at least one functional element, and the desired performance of the at least one functional element of the IC was verified after connection of the compatible clock nets by simulation.

17. The integrated circuit of claim 16, wherein the plurality of clock drivers that can be shared are connected by hardware control.

18. The integrated circuit of claim 17, wherein the hardware control to connect the plurality of clock drivers that can be shared also uses one or more CMOS gates.

19. The integrated circuit of claim 16, wherein the desired performance of the least one functional element of the IC is verified by using a timing analysis CAD tool.

20. The integrated circuit of claim 16, wherein an RC extraction CAD tool is utilized in determining the electrical load on one or more clock nets.

* * * * *